United States Patent
Nagumo et al.

[11] 3,727,625
[45] Apr. 17, 1973

[54] PNEUMATIC ADJUSTOR

[75] Inventors: Ryoichi Nagumo; Noriaki Kitamura, both of Katsuta-shi, Japan

[73] Assignee: Hitachi, Ltd., Tokyo, Japan

[22] Filed: Nov. 15, 1971

[21] Appl. No.: 198,738

[30] Foreign Application Priority Data

Dec. 4, 1970 Japan..............................45/106806

[52] U.S. Cl...........................137/86, 137/DIG. .001
[51] Int. Cl......................F15b 5/00; G05d 16/00
[58] Field of Search.......137/86, 85, 84, DIG. .001

[56] References Cited

UNITED STATES PATENTS 3,680,580   8/1972   Beardsley..............................137/86

*Primary Examiner*—Alan Cohan
*Attorney*—Thomas E. Beall, Jr.

[57] ABSTRACT

A selective manual and automatic pressure control for feeding desired fluid pressure to a device having a measured fluid pressure feedback line, wherein the automatic operation will equalize or otherwise correlate the feedback pressure and a standard pressure value in steady scate automatic operation, with the improvement being that operation may be switched from manual to automatic without any instantaneous change in the feeding fluid pressure at the moment of switching even though the feedback fluid pressure during manual operation differs from the standard fluid pressure valve. Force or distance outputs of fluid fed transducers are automatically compared by oppositely acting flapper nozzles, with the feeding fluid pressure, feedback fluid pressure, standard fluid pressure, and a selected fluid pressure being fed to respective ones of four transducers. During automatic operation, the selected transducer fluid pressure will be that of the feeding fluid pressure with the interposition of a delay and the output of one flapper nozzle will be amplified to provide the feeding fluid pressure, and during manual operation, the selected transducer fluid pressure will be the amplified output of the other flapper nozzle and the feeding fluid pressure will be manually controlled.

9 Claims, 2 Drawing Figures

PNEUMATIC ADJUSTOR

BACKGROUND OF THE INVENTION

It is believed to be known to provide a fluid pressure control having both manual and automatic operation, with four fluid bellows cooperating to control the action of a flapper nozzle. The output feeding pressure is supplied to one bellows, a set standard pressure is supplied to a second bellows, a feedback measured fluid pressure from the device being controlled is fed to a third bellows, and the output fluid pressure of the control is fed to the fourth bellows with the interposition of delay means. The back pressure on the flapper nozzle is amplified and provided as the output pressure for automatic operation, and during manual control, a manually operated throttle valve provides the output feeding fluid pressure.

A complicated computing device will maintain the output feeding pressure substantially constant during switching from manual to automatic operation by adding or subtracting measured differences. How-ever this complicated device suffers from the disadvantages of high initial cost and maintenance, as well as all the other conventional problems associated with overly complex controls.

SUMMARY OF THE INVENTION

The complexity of the above-mentioned device is avoided while at the same time providing for a substantially constant fluid pressure feeding output during switching from manual to automatic operation. The force or displacement transducers or bellows of the present invention are respectively connected to the output feeding fluid pressure, a standard fluid pressure, a measured feedback fluid pressure from the device being controlled, and a selected fluid pressure so as to affect two flapper nozzles in an opposite sense. That is, while one flapper nozzle will be increasing in fluid pressure during a change, the other flapper nozzle will be decreasing in fluid pressure during the same change. With manual control, the output feeding fluid pressure will be under the control of a manually adjustable fluid throttle and the sensed fluid pressure of one flapper nozzle will be amplified and fed as the fluid pressure for the fourth transducer having a selected fluid pressure, and during automatic operation the sensed fluid pressure of the other flapper nozzle will be amplified for feeding as the output fluid pressure and further provided through a delay as the selected fluid pressure for the fourth transducer.

BRIEF DESCRIPTION OF THE DRAWING

Further objects, features and advantages of the present invention will become more clear from the following detailed description of the drawing, wherein.

DETAILED DESCRIPTION OF THE DRAWING

Figure 1:
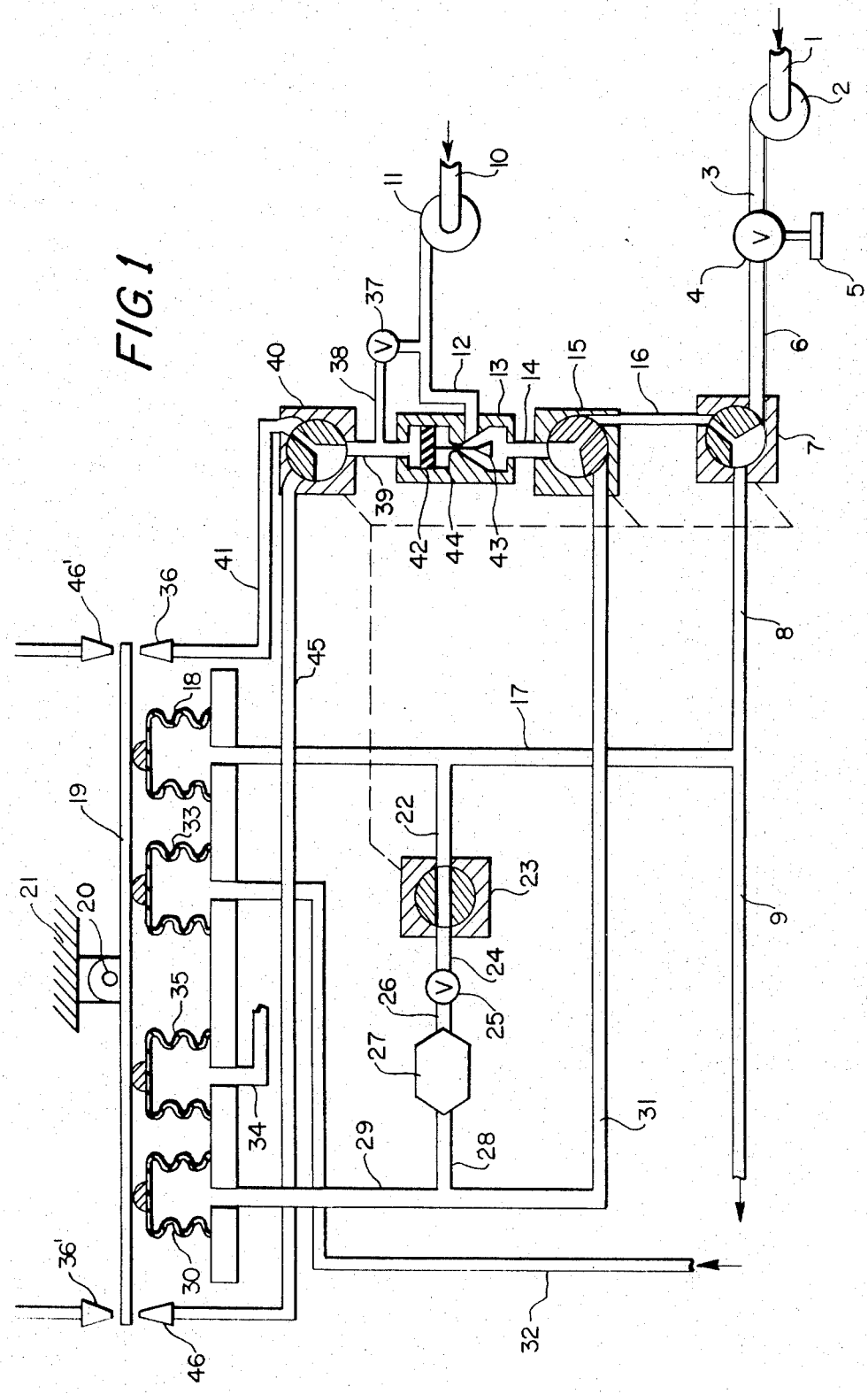
FIG. 1 is a somewhat schematic representation of the fluid adjustor according to the present invention wherein the force outputs of the various bellows or transducers are compared.

Most preferably, the present invention employs air as a fluid and will be described with respect to air, although it is contemplated that a liquid fluid such as a control oil or gas and liquid may be used with slight modification as would be known to a person having ordinary skill in the art of fluid controls. Further, since controls of this general nature are known, the specific device to which the fluid output is being fed will not be described in detail. There are many applications wherein under manual control it is desirable to change the fluid pressure being supplied over a substantial range of pressures, and wherein at other times it is desirable to provide a relatively constant fluid pressure, preferably automatically. With such devices, it is highly desirable to provide the changeover from manual to automatic operation without an instantaneous change in feeding or output fluid pressure of the fluid adjustor or control even though the fluid pressure being supplied by manual operation immediately preceding the switch is considerably different from the fluid pressure that would be provided under steady state conditions of the automatic operation, which would manifest itself as a pressure differential between the feedback fluid pressure as measured at some point in the device being controlled and a standard or constant fluid pressure used as a reference during automatic operation.

During manual operation of the pneumatic adjustor, air is fed through intake conduit 1 of a blower 2, and is preferably drawn from the atmosphere after passing through suitable filters or the like. The pressurized output from the blower 2 is fed through conduit 3 to a variable throttle valve 4, which will reduce the pressure of the air in a continuous manner over a considerable desired range under the operation of the handle 5 that may be manipulated by an operator. The adjusted pressure output of the variable throttle valve 4 is fed through line 6 to a switching valve 7, which is shown in its position for automatic operation. When the valve 7 is in its manual operation position, the line 6 will be directly and only connected with intermediate line 8 for passing the adjusted air pressure directly to output line 9 that feeds the adjusted pressure air directly to the device to be controlled or supplied. The remaining portions of the pneumatic adjustor, although operating as will be described in detail below, will have no affect upon the air pressure within output line 9.

During automatic operation, all of the valves are positioned as shown in FIG. 1 and air is drawn from the atmosphere after being filtered or the like through line 10 to a blower 11 where it is pressurized and fed under pressure through line 12 to a pressure adjusting pilot valve 13, to be described in more detail hereinafter. After the pressure is automatically adjusted as desired by the valve 13, the adjusted pressure is fed through line 14, through valve 15, through line 16, through valve 7, through intermediate line 8, and through the output line 9 leading to the device to be controlled or supplied with air under automatically adjusted pressure.

The output or feeding air pressure in lines 8 and 9 is also fed through line 17 to a sealed bellows 18 to correspondingly expand the bellows 18 and exert a force on the engaged balance beam 19, which is pivotally mounted at 20 to a stationary support 21. Further, the output or feeding pressure in lines 8 and 9 is fed through line 17, branch line 22, valve 23, line 24, fixed orifice throttle 25, line 26, surge or storage tank 27, line 28, and line 29 to the sealed bellows 30 for expanding the bellows to produce the corresponding force on the engaged balance beam 19 on the opposite side of the pivotal mounting 20 from the bellows 18. It will be seen that under steady state conditions, that is when the tank 27 has been filled with air under a pressure substantially the same as the pressure within lines 8 and 9, there is no air flowing through the throttle 25 so that there will be no throttling effect, the forces produced by bellows 18 and 30, which are equidistant from the pivotal mounting 20, will cancel each other so that the balance beam 19 will remain in its indicated intermediate normal position. Air under pressure within lines 28 and 29 will fill line 31, but will not flow from line 31 due to the blocking effect of the valve 15.

For controlling operation of the pilot valve 13, air pressure at a suitable point in the device being operated or controlled will be measured and fed back through feedback line 32 for filling the bellows 33 and producing a corrresponding force exerted on the engaged balance beam 19. For comparison purposes, a standard or constant air pressure, which can be provided by any conventional means not shown, is fed through line 34 to fill bellows 35 and exert a corresponding force on the engaged balance beam 19, which will tend to balance the force exerted by the bellows 33, since the bellows 33 and 35 are on opposite sides and equidistance from the pivotal mounting 20. Under steady state conditions for automatic operation, the forces produced by bellows 33 and 35 will balance each other so that the balance beam 19 will remain in its normal position.

The position of the balance beam 19 will control the back pressure on a flapper nozzle 36 to produce a control pressure for operating the pilot valve 13. Pressurized supply air in line 12 will be bled through fixed orifice throttle 37 to reduce its pressure and supply the reduced pressure air through line 38, line 39, valve 40, line 41, and nozzle 36. Since air is always passing through flapper nozzle 36 to the atmosphere or surrounding environment, air will always be flowing through the throttle 37 so that the air within line 41 will always be at a reduced pressure with respect to the air within line 12. Only a small volume of air will pass through the flapper nozzle 36 as compared to the air passing through output line 9, and the force of the air passing through nozzle 36 against the balance beam 19 will be fairly negligible and can be compensated for. In the known manner of flapper nozzles, the back pressure within line 41 will increase as the balance beam 19 moves toward the exit end of the nozzle 36, and the back pressure within line 41 will decrease as the balance beam 19 moves away from the exit end of the nozzle 36. This back pressure within line 41 will be fed through valve 40 and line 39 back to an expansible chamber formed by a movable diaphragm or piston 42 within the pilot valve 13. With increased back pressure, the diaphragm or piston 42 will move downwardly in FIG. 1 to correspondingly move the movable conical valve portion 43 downwardly by the driving connection of the intermediate rod 44. Preferably, the rod 44 reciprocates within a sealing gasket so that the expansible chamber on the lower side of the diaphragm or piston 42 is sealed with respect to the fluid surrounding the movable valve portion 43, and this lower chamber may be vented. Further, the piston or diaphragm 42 may be spring urged upwardly. It is thus seen that with movement of the balance beam 19 toward the nozzle 36, the back pressure within line 41 will increase to drive the piston 42 downwardly and further open the throttle valve provided by the movable valve member 43 to increase the flow and pressure of fluid on the downstream side of the valve 13 that is fed through line 14, valve 15, line 16, valve 7, line 8, and output line 9 to the device to be controlled. Correspondingly, movement of the balance beam 19 away from the nozzle 36 will reduce the back pressure and in the manner above reduce the flow and pressure of air within output line 9. In this manner, the nozzle back pressure is amplified by the pilot valve 13, and any conventional type of fluid amplifier or amplifying type of fluid valve may be provided.

When the feedback pressure changes within line 32 under automatic control, the position of the balance beam 19 will correspondingly change to produce a corresponding change in back pressure in line 41 which will be amplified by the valve 13 to correspondingly control the pressure and flow within output line 9. The delay provided by the throttle 25 and tank 27 will tend to prevent hunting in the control and produce a smoother operation.

While the bellows 30 and 18 have been indicated as being equidistant from the pivotal mounting 20 and the bellows 33, 35, have been indicated as being equidistant from the pivotal mounting 20, this spacing is not critical since various compensations may be made in the circuit, for example in the spring pressure provided with pilot valve 13. Further, the relative positioning of bellows 30 and 18, or bellows 33 and 35, may be interchanged.

The operation under complete automatic control has been set forth above. The operation of the automatic portion of the adjustor during manual control will be set forth below, which as explained previously will not have any affect upon the manually adjusted output pressure in line 9.

During manual control, each of the valves 7, 15, 40, 23 are changed from their position indicated in FIG. 1 and are mechanically interconnected as indicated for simultaneous movement during switching from manual to automatic operation. As before, the air pressure within output line 9 is fed through line 17 to the bellows 18, but the branch line 22 will be interrupted in its flow by valve 23, which will be closed. As in automatic operation, measured air pressure will be provided through feedback line 32 to the bellows 33, and the standard air pressure will be fed through line 34 to bellows 35. However, the amplified air pressure from pilot valve 13 will be fed by valve 15 to line 31 and through line 29 to the bellows 30, and the valve 15 will block any passage of fluid from the pilot valve 13 to the line 16. During the manual operation, the valve 40 will be in a position to supply throttled bleed air from line 38, through line 39, through line 45, and to flapper nozzle 46. At the same time, valve 40 will prevent fluid communication with the flapper nozzle 36. The flapper nozzle 46 will function in a manner identical with the flapper nozzle 36, but in an opposite sense. That is, rotational movement of the balance beam 19 in one direction that would in automatic operation produce an increase in back pressure in line 41 supplying 36, will for manual operation produce a decrease in back pressure in line 45 supplying throttle 46. In the manner previously described, this change in back pressure within line 45 will be amplified by the pilot valve 13 and fed to line 14. As described, this amplified back pressure from pilot valve 13 will be fed through line 14, valve 15, line 31, and line 29 to the bellows 30. With variations in the construction, it is contemplated that nozzle 46 may be in position 46' without changing the operation, and nozzle 36 may be in position 36', without changing the operation.

When switching from manual to automatic operation, there would of course be no difficulties if conditions were such that the output air pressure in line 9 for manual operation were the same as that to be produced by steady state automatic operation, so that the following discussion will relate to the more usual situation wherein the two would be different and the usual conventional type of adjustors would produce an instantaneous change or bump in pressure within line 9 during switching. Assuming that the various set characteristics of the adjustor were such that under steady state conditions of automatic operation, the pressure within bellows 33 and 35 would be the same, the switching operation will be described with respect to starting with the manual operation wherein the pressure in bellows 33 and 35 will be different. That is, the measured feedback pressure in line 32 will be considerably different from the standard pressure within line 34 under manual operation immediately before switching from manual to automatic operation.

Since it is the desired result of the present invention that during switching the pressure within output line 9 will not change, it follows that pressure within bellows 18 will not change and correspondingly its force on beam 19 will not change. Similarly, the measured pressure within feedback line 32 will not change since the output pressure within line 9 will not change, and accordingly the pressure within bellows 33 will not change and the force exerted by the bellows 33 upon the balance beam 19 will not change during switching operation. Since the pressure within line 34 is a constant standard, the pressure within bellows 35 will not change at any time and correspondingly its pressure exerted against the balance beam 19 will not change at any time. Further, since in switching from manual to automatic operation, the valve 15 is closed with respect to line 31 and the surge tank 27 together with the throttle 25 will provide a delay for any change in pressure within the line 29 and bellows 30, the force exerted by the bellows 30 against the balance beam 19 will not change during switching.

If under manual operation the pressure within output line 9 and correspondingly the pressure within feedback line 32 is less than what would be provided by a steady state automatic control, the pressure within bellows 18 and 33 would correspondingly be less, which would produce a greater than normal gap between the balance beam 19 and the nozzle 46, a less than normal gap between the nozzle 36 and the balance beam 19, a back pressure in the line 45 that would be less than the steady state automatic back pressure in line 41, and a pressure within line 31 and bellows 30 as determined by pilot valve 13 under the back pressure of line 45 that would be correspondingly less than the output pressure of the pilot valve 13 under steady state automatic operation. The various fixed characteristics of the apparatus are such that this output pressure of the pilot valve 13 during manual operation will be substantially the same as the output pressure within line 9 so that when valves 7 and 15 move from their manual positions into their automatic positions shown in FIG. 1, the output pressure of pilot valve 13 will be directly fed to the output line 9 and the manual pressure in line 6 will be interrupted in its communication with output line 9, and there will be no abrupt change in output pressure within line 9. Since valve 40 will also be operated during switching to change the feed of throttle bleed air from nozzle line 45 to nozzle line 41, the back pressure supplied to the pilot valve will increase for this particular example of operation to correspondingly increase the output pressure of the pilot valve 13 and start to bring up the output pressure in line 9 and the feedback pressure in line 32 to the values they should be for steady state automatic control in a smooth and continuous fashion. The smoothness of this automatic pressure increase will be enhanced by the direct increase in pressure within the bellows 18 and the delayed increase in pressure within the bellows 30 as provided by the direct line connection 17 and the delayed connection through the throttle 25 and tank 27, respectively.

It is thus seen that during manual operation, the apparatus according to the present invention satisfies the formula $P_{30} = P_{18} - K(P_{35} - P_{33})$.

$P_{30}$ equals the pressure within bellows 30.

$P_{18}$ equals the pressure within bellows 18, that is the output pressure within output line 9.

$P_{35}$ equals the pressure within bellows 35, that is the standard or fixed pressure within line 34.

$P_{33}$ equals the pressure within bellows 33, that is the measured pressure within feedback line 32.

During manual operation, the pressure $P_{18}$ equals the manual pressure or $P_{MAN}$, therefore, the equation becomes:

$$P_{30} = P_{MAN} - K(P_{35} - P_{33})$$

MANUAL OPERATION

Under automatic operation, the apparatus of the present invention satisfies the following equation:

$$P_{18} = P_{30} + K(P_{35} - P_{33})$$

AUTOMATIC OPERATION

Due to the delayed action of the tank 27 and throttle 25, the pressure within bellows 30 will not change during switching so that the pressure $P_{30}$ of the equation for automatic control equals the corresponding pressure in the preceding equation for manual control, so that the equation for automatic control by substitution becomes at the moment of switching:

$$P_{18} = P_{MAN} - K(P_{35} - P_{33}) + K(P_{35} - P_{33}) = P_{MAN}$$

SWITCHING

Thus, at the instant when manual control is changed to automatic control, the output pressure of the pilot valve becomes equal to the output from the manually controlled pressure reducing valve whether there is a difference between the measured pressure within line 32 and the standard pressure within line 34 or not.

Figure 2:
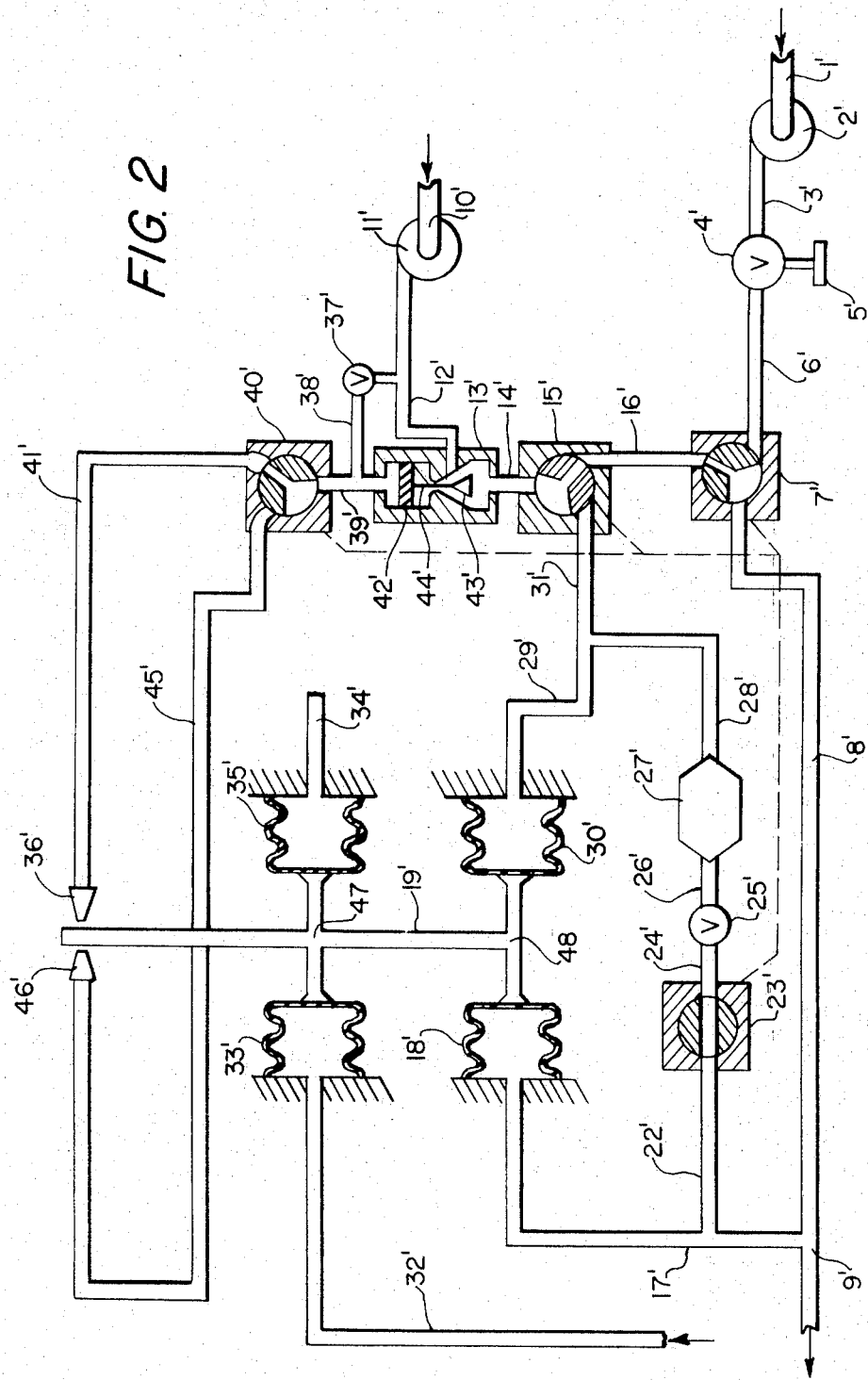
FIG. 2 is similar to the device of FIG. 1, but the displacement outputs of the bellows or transducers are compared.

In the embodiment of FIG. 2, elements that are identical in structure and function with those previously described in FIG. 1 are referred to by the same numerals as in FIG. 1, with the basic difference between the two embodiments being that the balance beam 19' is supported solely by pivotal connections 47, 48 with linkages drivingly connected to the respective bellows 18', 30', 33', 35'. The opposite end of the balance beam 19' freely extends between the opposed nozzles 36', 46' to operate as their joint flapper. The operation is the same as that previously described with respect to FIG. 1, and for that reason will not be repeated.

It is thus seen that the pneumatic adjustor according to the present invention will provide for unlimited manual adjustment of the output pressure within the desired range, automatic adjustment of the output pressure as determined by a standard, and switching from manual to automatic under all circumstances without abruptly changing the output pressure so that the switching is bumpless in effect.

Further variations, modifications and embodiments are contemplated according to the broader aspects of the present invention even though the specifically described and illustrated details are of considerably merit in their own narrow right, according to the spirit and scope of the following claims.

What is claimed is:

1. A selective manual and automatic pressure control for feeding desired fluid pressure to a device having a measured fluid pressure feedback line and an automatic operation that will provide a predetermined relationship between the feedback pressure and a standard pressure value in steady state automatic operation, with the improvement being that operation may be switched from manual to automatic without any change in the feeding fluid pressure at the moment of switching even though the feeding fluid pressure during manual operation differs from what the feeding fluid pressure would be under steady state automatic operation, comprising:
   an output fluid line for feeding fluid pressure to the device;
   first transducer means responsive to the standard fluid pressure to produce an output;
   second transducer means responsive to the feedback fluid pressure to produce an output;
   third transducer means responsive to the fluid pressure in said output fluid line to produce an output;
   fourth transducer means responsive to a selected fluid pressure to produce an output;
   means comparing the outputs of said first, second, third, and fourth transducer means to produce a first comparison output fluid pressure that increases with an increase in one of said first and second transducer means outputs, increases with an increase in one of said third and fourth transducer means outputs, decreases with a decrease in the other of said first and second transducer means outputs, and decreases with a decrease in the other of said third and fourth transducer means outputs according to one mode of operation;
   said comparing means further comparing the outputs of said first, second, third, and fourth transducer means to produce a second comparison output fluid pressure that increases with an increase in the other of said first and second transducer means outputs, increases with an increase in the other of said third and fourth transducer means outputs, decreases with a decrease in the one of said first and second transducer means outputs, and decreases with a decrease in the one of said third and fourth transducer means outputs according to a second mode of operation;
   means for producing a manually controlled adjustable fluid pressure; and
   means switching the first comparison output fluid pressure to said fourth transducer means and said manually controlled fluid pressure to said output fluid line for manual operation, and switching the second comparison output fluid pressure to said output fluid line and the fluid pressure from said output fluid line to said fourth transducer means for automatic operation.

2. The control according to claim 1, wherein each of said transducer means is a bellows expansible in one direction in response to an increase in fluid pressure within its interior.

3. The control according to claim 1, including a pressure change delay means in fluid circuit between said output fluid line and said fourth transducer means only under automatic operation.

4. The control of claim 1, wherein said comparing means includes a first fluid nozzle, a second fluid nozzle, a flapper element driven by each of said transducer means toward said first nozzle and away from said second nozzle in one direction and toward said second nozzle and away from said first nozzle in the other direction.

5. The control according to claim 4, including means for supplying fluid only to said first nozzle and amplifying the back pressure of said first nozzle to produce the first comparison output fluid pressure according to the one mode of operation, and supplying fluid under pressure only through said second nozzle and amplifying the back pressure of said second nozzle to produce said second comparison output fluid pressure according to said second mode of operation.

6. The control of claim 5, wherein said amplifying means is a single pilot valve fed with fluid under pressure to be controlled and the back pressure of a selected one of said nozzles.

7. The control according to claim 6, wherein said comparing means includes a single valve having a single valve passage for switching low pressure supply air between said nozzles and selectively connecting one of said nozzles with said pilot valve to supply back pressure.

8. A selective manual and automatic pressure control for feeding desired fluid pressure to a device, with the improvement being that operation may be switched from manual to automatic without any change in the feeding fluid pressure at the moment of switching even though the feeding fluid pressure during manual operation differs from what the feeding fluid pressure would be under steady state automatic operation, comprising: an output fluid pressure line; means for feeding fluid under manually adjusted pressure; means for comparing a pressure correlated to the pressure within said output line with a standard to produce two control signals changing in characteristic oppositely from each other in response to change in said correlated fluid pressure; a single automatic means selectively responsive to one of said signals to produce a correlated first fluid pressure output and responsive alternately to the other of said signals to produce a correlated second fluid output; and switching means having one position for feeding the manually adjusted fluid output to said output fluid pressure line, feeding only said first signal to said automatic means and blocking said correlated first fluid output from communication with said output line, and having a second position blocking said manually adjusted fluid output with respect to said output fluid pressure line, feeding only said second signal to said automatic means and feeding the output of said automatic means to said outlet line.

9. The control according to claim 8, wherein said automatic means is a single pilot valve.

* * * * *